United States Patent
Adari

(10) Patent No.: US 11,321,698 B2
(45) Date of Patent: May 3, 2022

(54) SMART WEARABLE RING BASED WIRELESS TRANSACTION SYSTEM AND METHOD THEREOF

(71) Applicant: Swarna Kumari Adari, Visakhapatnam (IN)

(72) Inventor: Swarna Kumari Adari, Visakhapatnam (IN)

( * ) Notice: Subject to any disclaimer, the term of this patent is extended or adjusted under 35 U.S.C. 154(b) by 32 days.

(21) Appl. No.: 17/050,051

(22) PCT Filed: Apr. 23, 2019

(86) PCT No.: PCT/IB2019/053330
§ 371 (c)(1),
(2) Date: Oct. 23, 2020

(87) PCT Pub. No.: WO2019/207472
PCT Pub. Date: Oct. 31, 2019

(65) Prior Publication Data
US 2021/0097520 A1   Apr. 1, 2021

(30) Foreign Application Priority Data

Apr. 23, 2018   (IN) .............................. 201841015370

(51) Int. Cl.
*G06Q 40/02*   (2012.01)
*G06Q 20/32*   (2012.01)
(Continued)

(52) U.S. Cl.
CPC ........... *G06Q 20/321* (2020.05); *G06F 3/014* (2013.01); *G06F 3/038* (2013.01); *G06F 3/0362* (2013.01);
(Continued)

(58) Field of Classification Search
CPC ............. G06Q 20/321; G06Q 20/1085; G06Q 20/204; G06Q 20/3278; G06Q 20/4012; G06Q 40/02; G06Q 20/02; G06Q 20/3829; G06Q 20/40145; G06Q 2220/00; G06Q 20/32; G06F 3/014; G06F 3/03547; G06F 3/0362; G06F 3/038; G06F 21/6209; G06F 21/6245; G06F 3/017; G06F 3/0346;
(Continued)

(56) References Cited

U.S. PATENT DOCUMENTS

2020/0401183 A1* 12/2020 von Badinski ....... H02J 7/0047

FOREIGN PATENT DOCUMENTS

CN    109085885 A  * 12/2018
WO    WO-2018030887 A1 *  2/2018  ............. G06F 3/033

OTHER PUBLICATIONS https://web.archive.org/web/*/smartringnews.com (Year: 2020).*

* cited by examiner

*Primary Examiner* — Russell S Glass

(57) ABSTRACT

The present invention relates generally to the field of wearable devices and transaction banking, and more particularly to a smart wearable ring based wireless transaction system and method thereof which has capability to works at both point of sale (PoS or POS or Pos) system and/or at automated teller machine (ATM) centers for our purchases as well as for ATM transactions. Accordingly, an aspect of the present invention is to a smart ring having one or more inner rings, wherein each ring is utilized to set pin on the ring to enable the RFID chip which is embedded in the ring to initiate/perform at least one transaction.

11 Claims, 4 Drawing Sheets

(51) Int. Cl.
*G06F 3/01* (2006.01)
*G06F 3/0354* (2013.01)
*G06F 3/0362* (2013.01)
*G06F 3/038* (2013.01)
*G06F 21/62* (2013.01)
*G06Q 20/10* (2012.01)
*G06Q 20/20* (2012.01)
*G06Q 20/40* (2012.01)
*G07F 19/00* (2006.01)
G06F 3/0346 (2013.01)
G06Q 20/02 (2012.01)
G06Q 20/38 (2012.01)

(52) U.S. Cl.
CPC ...... *G06F 3/03547* (2013.01); *G06F 21/6209* (2013.01); *G06F 21/6245* (2013.01); *G06Q 20/1085* (2013.01); *G06Q 20/204* (2013.01); *G06Q 20/3278* (2013.01); *G06Q 20/4012* (2013.01); *G06Q 40/02* (2013.01); *G07F 19/201* (2013.01); *G06F 3/017* (2013.01); *G06F 3/0346* (2013.01); *G06F 2203/0331* (2013.01); *G06Q 20/02* (2013.01); *G06Q 20/3829* (2013.01); *G06Q 20/40145* (2013.01); *G06Q 2220/00* (2013.01)

(58) Field of Classification Search
CPC ........... G06F 2203/0331; G06F 3/0304; G07F 19/201; G07F 9/001; H04L 2209/38
USPC .......................................................... 705/17
See application file for complete search history.

SMART WEARABLE RING BASED WIRELESS TRANSACTION SYSTEM AND METHOD THEREOF

TECHNICAL FIELD

The present invention relates generally to the field of wearable devices and transaction banking, and more particularly to a smart wearable ring based wireless transaction system and method thereof which has capability to works at both point of sale (PoS or POS or Pos) system and/or at automated teller machine (ATM) centers for our purchases as well as for ATM transactions.

BACKGROUND

Historically, consumer purchases were actually trades, an exchange of an item of value for a different item of similar value. The invention of currency thousands of years ago provided the ability to carry something of general value that could be exchanged for virtually any useful item, thus lightening a consumer's load considerably. The much more recent invention of credit cards has allowed the consumer to carry an item representing value that was not itself intrinsically valuable, reducing the consumer's load and value as a theft target but still allowing him or her to carry considerable purchasing power.

The still more recent invention of debit cards has enabled consumers to wield the purchasing power accorded to credit cards without meeting the credit worthiness requirements of credit accounts and without incurring the associated debt. Debit cards draw from a positive account balance maintained by the user and require verification of identification, usually a personal identification number (PIN) to complete a purchase.

"SmartCards" are another recent transaction device that also requires a personal identification number to complete a transaction. SmartCards, like debit cards, execute purchases from a positive account balance but the balance is maintained in the card itself. Additions to the card balance must be properly purchased and, typically, SmartCards have safeguards against an illicit account increase.

Credit-card and debit-card purchases require the use of a physical card or at least its entry into a purchasing system by number. In point-of-purchase transactions, the buyer must either hand the card to a salesperson or physically "swipe" the card through a card reader slot. A salesperson merely does the swiping for the buyer or enters the card number by keypad or by phone. Food purchases by use of a debit card are very common at present day supermarkets. However, virtually all consumers have horror stories of waiting in the checkout line while a customer ahead in the line fumbles ineptly through the card purchase process, unable to master the intricacies of the card reader.

Users of SmartCards are not immune to the disadvantages above. A buyer of goods from an automatic SmartCard-reading vending machine is required to swipe the card through a slot. The buyer is then required to enter a PIN to verify his or her identity and authorization for a purchase. Systems have begun to emerge that allow the non-contact use of SmartCards through RF or infrared technology. However, a PIN must still be entered at some point in the transaction. If a SmartCard is stolen and the thief is able to acquire the rightful user's PIN, then there is no safeguard remaining to prevent the thief's access to the SmartCard's entire balance.

A reliable means of determining the identity of a potential user of a SmartCard, and thus whether that person is an authorized user, is by the use of biometric data identification. Biometric data is data taken from the measurement of some characteristic peculiar to an individual. A digitized thumbprint is an example of biometric data. Iris scans, speech pattern scans or various body temperature or electrical characteristics are also biometric data.

In a system that uses biometric data for identification, a device that reads biometric data scans the relevant measurement of the candidate for identification. The attached system then compares the scanned data with data stored in the SmartCard. A match of data sets is then sufficient for identification.

A now-common implementation of such a scheme is the use of a thumbprint scanner which can read the user's thumbprint and determine whether it compares favorably with a stored thumbprint. If the user's data does not compare favorably, the system to which the identifying device is connected refuses to allow access to either on-board data or a network or, in this case, a purchase. An iris scanner or a speech pattern reader functions similarly, though may be somewhat more difficult to implement. Unfortunately, systems using biometrics still require physical contact between a user and a system and the system can be bulky and expensive.

Also, some NFC rings are working similar to prepaid card. The user need to load the money to these prepaid rings as the user does for prepaid card and make the transaction as per the amount loaded in the rings. If the amount of transaction is more than the available balance in the ring, the transaction gets declined. The user need to load money every-time and also need to track the transaction and remaining balance.

A need exists, therefore, for a means of enabling efficient and user-friendly SmartCard transactions that do not require physical contact. A further need exists for such a means to employ biometric data reading in its operation and to fit in an easy to use and carry form factor. Another need exists for a user to be able to enable and authorize a transaction using a SmartCard without the physical exposure of a SmartCard to damaging use.

Recent development in the field of safe wireless transactions is by an authentication technique that utilizes a ring with a unique identifier and near-field communication (NFC) to authenticate use of a device by a user who wears the ring for seamless authentication. For example, a mobile phone or other device of the user can be implemented for NFC communication of the unique identifier from the ring to authenticate the user and initiate operability of the device for use. However, this conventional authentication technique is not specific to a designated user, but rather, only to a person who has the ring. If both the mobile phone and the ring are lost or stolen, any person that has both can be authenticated to the phone, which will then be operable with the potential for misuse as well as the information and data that may be accessed on the device.

Currently few financial institutions introduced smart NFC rings for bank customers to pay the bills at merchant sites, however if user needs to use the smart ring for multiple banks then customer has to wear multiple rings to do financial transactions. Also this device can only works at POS and billing counters but not at ATM centers to do normal ATM transactions like cash withdrawals and deposits. Further, if the user loses the ring and if there is no second level of authentication such as PIN based or OTP based then it might be biggest threat to bank customers.

SUMMARY

The present invention relates generally to the field of wearable devices and transaction banking, and more particularly to a smart wearable ring based wireless transaction system and method thereof which has capability to works at both point of sale (PoS or POS or Pos) system and/or at automated teller machine (ATM) centers for our purchases as well as for ATM transactions.

The primary object of the present invention is to implement new enhanced secure smart ring which can works at both POS and at ATM centers for regular purchases as well as for all our regular ATM transactions.

Accordingly, an aspect of the present invention is to a smart ring having one or more inner rings, wherein each inner ring is utilized to set a pin (RPIN) on the ring to enable the RFID chip which is embedded in the ring to initiate/perform at least one transaction.

In an aspect, the PIN of the smart ring is provided by the bank and/or by the manufacturer. In case, the manufacture provides the PIN, the user can associate that PIN with his particular bank account for transaction.

In an aspect, the smart ring which is a wearable authentication device are described, such as a ring that can be worn by a user to authenticate the user to a device that is associated with the ring. In implementations, a ring that a user wears can include a fingerprint sensor to capture a fingerprint image that is used to authenticate the user.

The ring can also include a presence sensor that periodically detects a presence of the user wearing the ring, and presence data is communicated to the associated device to maintain operability of the associated device. If the presence of the user is not detected or maintained, the associated device can be rendered inoperable. With some fingerprint or touch sense technologies, such as capacitive, ultrasonic, thermal, pressure, and optical, the fingerprint sensors can also detect user presence rather than implementing a separate presence sensor.

In implementations, a fingerprint sensor may be a fingerprint touch sensor or a fingerprint swipe sensor integrated in a wearable authentication device to capture a fingerprint image. For example, a fingerprint touch sensor can be integrated into the top of a ring, and when the ring is worn on a finger of one hand, the user can touch a finger of the other hand on the fingerprint touch sensor. Alternatively, a fingerprint swipe sensor can be integrated inside a band of a ring to capture the fingerprint image as the ring is placed on a finger of the user. Additionally, the fingerprint swipe sensor can be implemented to capture up to a three-hundred and sixty degree (360°) image (or approximate 360° image) of the finger as the ring is placed on the finger of the user.

In implementations, a presence sensor may be a capacitive sensor that detects user presence based on continued contact with a wearable authentication device, such as contact with a ring from a finger of a user. The fingerprint swipe sensor that is integrated inside a band of a ring may also include presence sensing capability with an integrated presence sensor or mode, such as a capacitive sensor that detects user contact and/or an ultrasonic sensor to detect an ultrasound feedback that confirms user presence. In implementations, a wearable authentication device can also include a data exchange system, such as for near-field communication (NFC) with an NFC chip or with Bluetooth™ low energy (BLTE), to communicate a fingerprint image, an image of a finger, a unique identifier of the wearable authentication device, and/or presence data to the associated device for authentication and to maintain operability of the associated device.

In implementations, these innovative rings directly connect with the bank server. So, there is no need to load money every time. Everytime the user transact using these rings, the amount will be directly deducted from the user respective bank account. The authentication for the transaction using such rings every time the user transact can be done with the bank server and by any method like OTP, user selected PIN and any other bio-metric method.

In implementations, the information stored on the ring is always in the encrypted form to ensure the safety of the financial information stored in the ring.

The rind ID is the identifying number to identify the ring uniquely. The ring ID is provided by the manufacturer and can't be altered.

In implementations, the RPIN is the ring PIN. RPIN is used to initiate the RING in any wireless environment. If the RPIN is wrong, the ring will not work.

The priority number is used to select the respective bank or credit card for the transaction at POS. The priority number is the single or multi digit number set by the user for each bank account or credit card. The priority number can be chosen from 0-9.

Consideration is now being given to ways of enhancing interoperability of electronic payment devices that are used in contactless electronic payment systems. Attention is directed to reducing variations in card and reader properties consistent with commonly accepted Standards. In particular, attention is directed to improving specification compliance procedures to enhance interoperability.

Further features of the invention, its nature and various advantages will be more apparent from the accompanying drawings and the following detailed description.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

The diagrams are for illustration only, which thus is not a limitation of the present disclosure, and wherein.

DETAILED DESCRIPTION

Figure 1A:
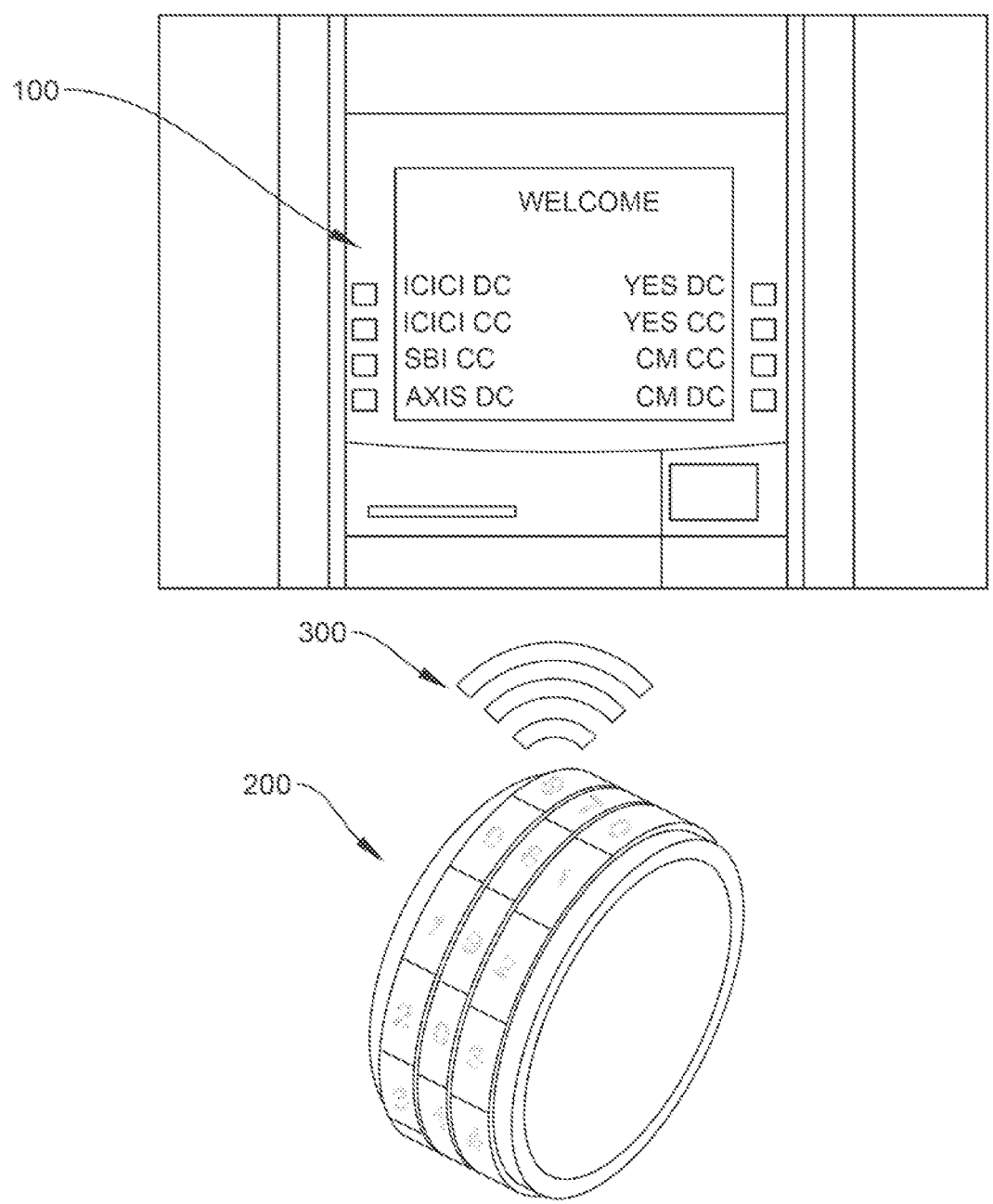
FIG. 1A-1B illustrates an exemplary overall architecture of the proposed system to elaborate its working, in accordance with an exemplary embodiment of the present disclosure.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, and firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Exemplary embodiments will now be described more fully hereinafter with reference to the accompanying drawings, in which exemplary embodiments are shown. These exemplary embodiments are provided only for illustrative purposes and so that this disclosure will be thorough and complete and will fully convey the scope of the invention to those of ordinary skill in the art. The invention disclosed may, however, be embodied in many different forms and should not be construed as limited to the embodiments set forth herein. Various modifications will be readily apparent to persons skilled in the art. The general principles defined herein may be applied to other embodiments and applications without departing from the spirit and scope of the invention. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure). Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named element.

Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims.

All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Various terms as used herein are shown below. To the extent a term used in a claim is not defined below, it should be given the broadest definition persons in the pertinent art have given that term as reflected in printed publications and issued patents at the time of filing.

The present invention relates generally to the field of wearable devices and transaction banking, and more particularly to a smart wearable ring based wireless transaction system and method thereof which has capability to works at both point of sale (PoS or POS or Pos) system and/or at automated teller machine (ATM) centers for our purchases as well as for ATM transactions.

The primary object of the present invention is to implement new enhanced secure smart ring which can works at both POS and at ATM centers for regular purchases as well as for all our regular ATM transactions.

Accordingly, an aspect of the present invention is to a smart ring having one or more inner rings, wherein each inner ring is utilized to set a pin on the ring to enable the RFID chip which is embedded in the ring to initiate/perform at least one transaction, and wherein each PIN is associated to a particular bank account to perform the transaction.

It may be appreciated that the RFID chip for transmitting RFID signals are merely used for exemplary and illustrative purposes. Any wireless communication capable chip such as but not limited to NFC chips may also be used instead of RFID chips in the present invention and accordingly the associated signal may be transmitted. Accordingly, based on the usage of chip a corresponding the reader device may be used for receipt of the transmitted signals.

In an aspect, the smart ring which is a wearable authentication device are described, such as a ring that can be worn by a user to authenticate the user to a device that is associated with the ring. In implementations, a ring that a user wears can include a fingerprint sensor to capture a fingerprint image that is used to authenticate the user to an associated device, such as and ATM or PoS.

The ring can also include a presence sensor that periodically detects a presence of the user wearing the ring, and presence data is communicated to the associated device to maintain operability of the associated device. If the presence of the user is not detected or maintained, the associated device (ATM or PoS) can be rendered inoperable.

In implementations, a fingerprint sensor may be a fingerprint touch sensor or a fingerprint swipe sensor integrated in a wearable authentication device to capture a fingerprint image. For example, a fingerprint touch sensor can be integrated into the top of a ring, and when the ring is worn on a finger of one hand, the user can touch a finger of the other hand on the fingerprint touch sensor. Alternatively, a fingerprint swipe sensor can be integrated inside a band of a ring to capture the fingerprint image as the ring is placed on a finger of the user. Additionally, the fingerprint swipe sensor can be implemented to capture up to a three-hundred and sixty degree (360°) image (or approximate 360° image) of the finger as the ring is placed on the finger of the user.

In implementations, a presence sensor may be a capacitive sensor that detects user presence based on continued contact with a wearable authentication device, such as contact with a ring from a finger of a user. The fingerprint swipe sensor that is integrated inside a band of a ring may also include presence sensing capability with an integrated presence sensor or mode, such as a capacitive sensor that detects user contact and/or an ultrasonic sensor to detect an ultrasound feedback that confirms user presence. In implementations, a wearable authentication device can also include a data exchange system, such as for near-field communication (NFC) with an NFC chip or with Bluetooth™ low energy (BLTE), to communicate a fingerprint image, an image of a finger, a unique identifier of the wearable authentication device, and/or presence data to the associated device for authentication and to maintain operability of the associated device.

While features and concepts of a smart wearable ring can be implemented in any number of different devices, systems, and/or configurations, embodiments of a wearable authentication device are described in the context of the following example devices, systems, and methods.

FIG. 1 illustrates an exemplary overall architecture of the proposed system to elaborate its working, in accordance with an exemplary embodiment of the present disclosure. As shown in FIG. 1, the smart ring can contain one or more inner rings, wherein each inner ring is utilized to set a pin on the ring to enable the RFID chip which is embedded in the ring to initiate/perform at least one transaction and wherein each PIN is associated to a particular bank account to perform the transaction.

In an exemplary embodiment, the PIN of the ring can be given by the bank or by the manufacturer.

In an exemplary embodiment, one or more colour codes can be provided on the ring instead of using the regular numbers. Once a correct pin/colour codes are set on the ring then the device starts working and when the user places the ring near NFC device it will automatically pair both the devices and it can start the transaction.

In an exemplary embodiment, these innovative rings directly connect with the bank server. So, there is no need to load money every time. Every time the user transact using these rings, the amount will be directly deducted from the user respective bank account. The authentication for the transaction using such rings every time the user transact can be done with the bank server and by any method like OTP, user selected PIN and any other bio-metric method.

In an exemplary embodiment, the ring can be given by the bank or can be purchased from any manufacturer.

In an exemplary embodiment, the bank or credit information can be loaded on the ring by setting the RPIN (Ring PIN) and placing the device near NFC module. The NFC module can be used to read the information from the user's debit card or credit card. By swiping/inserting/wireless connecting to the NFC module, the information can be loaded to ring using display based interface device, if required. The user can also load information in the ring using ATM.

In an exemplary embodiment, the NFC device or the ATM will ask for ring ID and RPIN and option to set the priority number (0-9) for each bank or credit card. The priority number is used to select the respective bank or credit card for the transaction at POS.

In an exemplary embodiment, the information stored on the ring is always in the encrypted form. The key to this encryption is only available with the bank. The information can be decrypted or modified using the NFC module using private key along with other security details to enhance the security of the information stored in the ring.

Figure 1B:
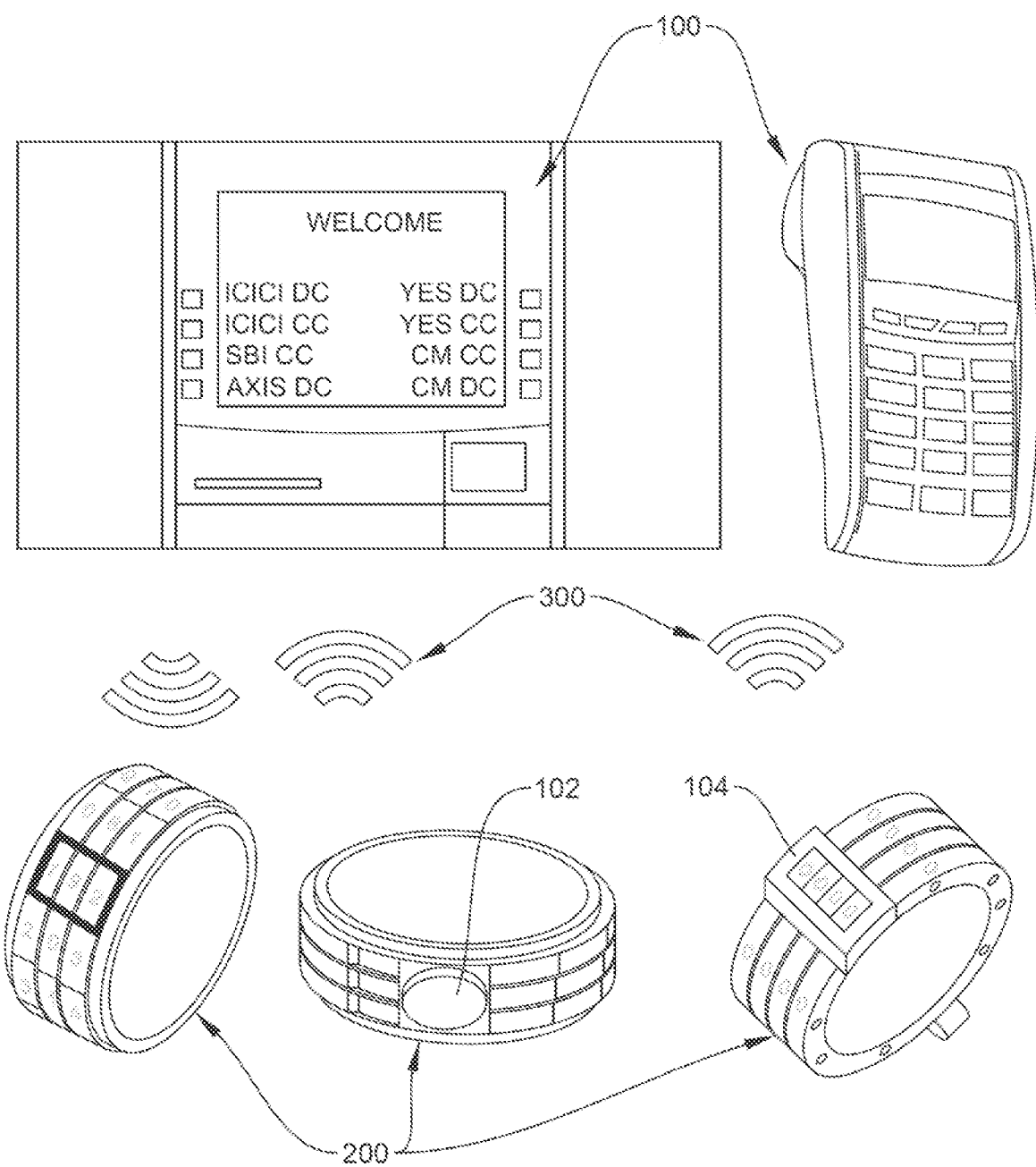

In an exemplary embodiment, while transacting at ATM, the ATM machine will pick up all the stored bank and card information in the ring. All the bank and credit card can be displayed on the display of the ATM or the POS device as shown in FIG. 1B. By selecting the card, the user decided to go forward with the transaction. Based on the type of authentication selected by the user, the transaction will complete if the balance funds is available and authentication method is approved by the bank server.

In an exemplary embodiment, Bank DC—Where DC represents Debit Card and Bank CC—Where CC represents Credit Card as illustrated in FIG. 1B.

The ATM will display all the configured bank and credit card account on the display of the ATM, once the user completes its first transaction. The user can repeat the steps and do another successful transaction from the same card or from different card. Once the user completes the transaction(s), the user can exit the ATM and the ATM will close the session.

While transacting with POS and/or mechant device, similar implementation like ATM can be possible. The POS device/reader will read the stored bank cards on the ring and display the cards on the display of the POS and/or merchant device. According user or operator can choose with which card transaction can be made.

In an exemplary embodiment, the user can either enable the chip inside the ring by using our mobile device such as enable or disable the chip.

In an exemplary embodiment, making transactions at POS and ATM are completely different and tricky. FIG. 1A-1B illustrates the proposed smart ring (200) to do the transactions at POS as well as at ATM (individually and alternatively referred to as "electronic devices (100) hereinafter"). Once the user sets pin on the ring and enter into ATM center or if the user stands near to the ATM, the ATM can read the information from the ring and associated bank names can be displayed on the ATM screen.

In an exemplary embodiment, the proposed ring can be configured with the plurality of bank accounts so ATM can detect all the configured banks from the ring and display all the bank names on the screen.

In an exemplary embodiment, the user can select the bank for transaction from the plurality of bank accounts displayed on the screen of ATM and enter the appropriate/associated bank ATM PIN (as second level authentication).

In an exemplary embodiment, the authentication can also be performed by entering the PIN, scanning the fingerprint or using any other biometric authentication.

In an exemplary embodiment, once the system authenticates the user then it displays the other options on the ATM screen to continue further the transaction. Once the transaction is completed the system can retain to the main screen which contains all the user specific bank names.

In an exemplary embodiment, once the user exits from the ATM center the system will automatically close the session and display the default ATM screen. All the information inside the ring is completely encrypted so only bank server can decrypt and understand the information. If third person try to steal the information from the ring they can get only encrypted data and or in binary format. The same ring can be used for multiple bank transaction at POS as well as at ATM's Every smart ring has an ID (identification), which is used to track, process and authenticate. The ring ID is unique and provided to the ring during manufacturing which might be active or disabled based on the time of purchase.

The manufacture and the bank official have the option to activate the ring for the first time. After that user can configure that ring accordingly.

In one implementation, if the user of the smart ring lost the ring, then user can call to the customer care/support staff of either any of the bank account configured to disable the smart ring or call the manufacture of the smart ring to disable the ring using ring id.

In one implementation, once the ring is disabled, the user does not need to call/inform every bank to do the same. Once it is disabled, the user needs to associate the bank accounts again to the new smart ring by going through bank procedures.

Electronics that permits contactless transactions is also added to the ring. The electronics may be an integrated circuit chip that includes an electromagnetic transmitter and/or receiver for wirelessly sending and/or receiving transaction information through a network (300).

In one implementation, the network (300) can be a wireless network, a wired network or a combination thereof. The network (300) can be implemented as one of the different types of networks, such as intranet, local area network (LAN), wide area network (WAN), the Internet, and the like. Further, the network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 104 can include a variety of network devices, including routers, bridges, servers, computing devices, storage devices, and the like.

Referring now to FIG. 1B, the proposed electronic wearable finger (200) can include a fingerprint sensor (102), control logic, a memory and a processor assembled into a substantially ring-shaped housing that is wearable on a finger of a user. The ring-shaped universal input device according to the present disclosure is capable of identifying an external device, establishing a communication channel with an identified external device and providing user instructions to the external device based on fingerprint sensor (102). The fingerprint sensor (102) can detect an authenticated user to whom the proposed electronic wearable finger (200) is assigned, and generate corresponding detection signals which are converted by the control logic and processor into instruction signals recognizable by the external device. The instruction signals are communicated to the external device through a wireless communication channel. The universal input device may include multiple ring members and can generate an instruction signal based on a combination of signals detected by multiple sensors.

For instance, while performing a contactless transaction using the proposed electronic wearable finger (200), the user may select a PIN using the plurality of inner rings, however, in order to provide approval to the transaction, the user may have to provide his biometric/finger print authentication via, scanning the finger print using the fingerprint sensor (102) provide on/embedded in the proposed electronic wearable finger (200).

In another exemplary embodiment, the proposed electronic wearable finger (200) can be provide with a pin selector slot (104) wherein when the user selects a PIN by rotating the plurality of inner rings of the proposed electronic wearable finger (200) and stations it at the pin selector slot (104), the proposed electronic wearable finger (200), can transmit the signal/PIN to the ATM/PoS in order to initiate the process.

In an alternate manner, if the accurate PIN is not stationed at the pin selector slot (104), the proposed electronic wearable finger (200) does not transmit any signal/PIN to the ATM/PoS in order to initiate the process.

Figure 2:
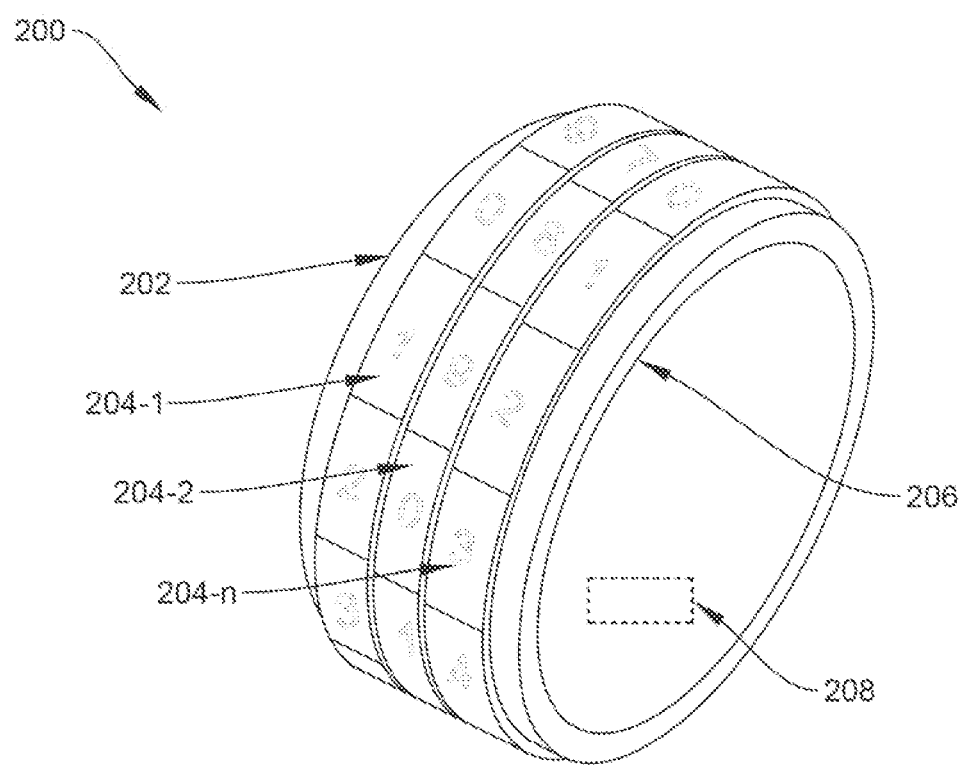
FIG. 2 illustrates an exemplary proposed electronic wearable finger ring to elaborate its working, in accordance with an exemplary embodiment of the present disclosure.

FIG. 2 illustrates an exemplary proposed electronic wearable finger ring to elaborate its working, in accordance with an exemplary embodiment of the present disclosure. The electronic wearable finger ring (200) can be configured to control a plurality of external devices (100) for performing a contactless transaction.

In an aspect, the electronic wearable finger ring includes a first border (202) and a second border (206), wherein said first border (202) and said second border (206) encloses a plurality of inner rings (204-1, 204-2, 204-n), each of the plurality of inner rings (204-1, 204-2, 204-n) having diameter equal to the diameter of said electronic wearable finger ring (200) and configured to control a plurality of external devices (100) for performing said contactless transaction.

In an aspect, each of the said plurality of inner rings (204-1, 204-2, 204-n) is used to enable the chip and put the ring to work.

In an aspect, each of the said plurality of inner rings (204-1, 204-2, 204-n) is rotatable and used to set the PIN for the transactions.

In an aspect, the plurality of PIN is used for transaction of various bank and each PIN is associated with different bank.

In an aspect, said electronic wearable finger ring can include one or more processors, and a controller (208), electronically coupled with each of said plurality of inner rings (204-1, 204-2, 204-n).

In an aspect, the controller can control the one or more processors to sense a touch event with at least one touch sensor embedded in each of the plurality of inner rings (204-1, 204-2, 204-n), wherein said touch event indicative of a selection of a personal identification number (PIN) to control said plurality of external devices (100).

In an aspect, each of said plurality of inner rings (204-1, 204-2, 204-n) comprises a plurality of selectable numbers, and wherein selecting a pre-configured sequence of said selectable numbers, indicative of the PIN, from the plurality of selectable numbers provided on each of said plurality of inner rings (204-1, 204-2, 204-n) triggers said controller (208) to control said plurality of external devices (100).

In an aspect, each of said plurality of inner rings (204-1, 204-2, 204-n) comprises a plurality of selectable colors, and wherein selecting a pre-configured sequence of said selectable colors, indicative of the PIN, from the plurality of selectable colors provided on each of said plurality of inner rings (204-1, 204-2, 204-n) triggers said controller (208) to control said plurality of external devices (100).

In an aspect, said controller (208) is a transmitter chip triggered from a remote location.

In an aspect, said electronic wearable finger ring is configured to electronically and communicable couple with said plurality of external devices (100) for performing said contactless transaction.

In an exemplary embodiment, the ring (200) may include at least one processor, an input/output (I/O) interface, and a memory. The at least one processor may be implemented as one or more microprocessors, microcomputers, microcontrollers, digital signal processors, central processing units, state machines, logic circuitries, and/or any devices that manipulate signals based on operational instructions. Among other capabilities, the at least one processor is configured to fetch and execute computer-readable instructions stored in the memory.

The I/O interface may include a variety of software and hardware interfaces, for example, a web interface, a graphical user interface, and the like. The I/O interface may allow the reader device 108 to interact with a user directly or through the client devices. Further, the I/O interface may enable the reader device 108 to communicate with other computing devices, such as web servers and external data servers (not shown). The I/O interface can facilitate multiple communications within a wide variety of networks and protocol types, including wired networks, for example, LAN, cable, etc., and wireless networks, such as WLAN, cellular, or satellite. The I/O interface may include one or more ports for connecting a number of devices to one another or to another server.

The memory may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory may include modules, routines, programs, objects, components, data structures, etc., which perform particular tasks or implement particular abstract data types.

In an embodiment, the ring (200) according to the present disclosure may act as a universal input device which allows a user to remotely interact with different electronic devices by using finger motions and gestures. Accordingly, embodiments of the present disclosure include a motion sensor, control logic, a memory and a processor assembled into a substantially ring-shaped housing that is wearable on a finger of a user. The ring-shaped universal input device according to the present disclosure is capable of identifying an external device, establishing a communication channel with an identified external device and providing user instructions to the external device based on user's finger motions or gestures. The motion sensor can detect the finger's various motions and/or gestures and generate corresponding detection signals which are converted by the control logic and processor into instruction signals recognizable by the external device. The instruction signals are communicated to the external device through a wireless communication channel. The universal input device may include multiple inner ring members and can generate an instruction signal based on a combination of signals detected by multiple sensors.

The universal input device may include a projector that can optically project a graphical user interface to an external surface as a visual guide for user's finger motions or gestures. Therefore, a user can conveniently interact with a variety of electronic devices by wearing the ring-shaped input device and issuing commands through finger motions and gestures.

The invention has mainly been described above with reference to a number of explicitly disclosed embodiments. However, as is readily appreciated by a person skilled in the art, other embodiments than the ones disclosed above are equally possible within the scope of the invention.

For example, mounting fewer amounts of components than described above (i.e. only microcontroller, Bluetooth, microstrip and antenna) the components may be mounted on only one side of the FPCB along the circumference of the toroidal shaped fingering structure in order to obtain a lower cost fabrication solution. Note, in this embodiment, the electronic circuit may function passively (i.e. no battery needed) communicating with near field technology (RFID, proximity cards etc.) which transfers signal via magnetic field induction using the above described antenna design.

Another example, in one embodiment the toroidal ring shell can be made of plastic instead of metal wherein the above mentioned conformal coating, coated either (or both) on the (i) inner circumference of the FPCB, or (ii). be deposited on the exterior of the inner circumference of the ring shell, mixed with cenospheres to function as a RF shielding on the users finger.

Concurrently, the plastic torodial ring shell could be made of light emitting polymers (LEP) electrically connected to the FPCB. In this embodiment the ring shell could communicate visually with its immediate vicinity by emitting electromagnetic radiation, for example a red colour, in order to communicate to other people that the user belongs to the "red" debate team just created at the college seminar course. In practice, the microcontroller may be configured to, in response to a signal received internally by the pressure- or accelerometer sensor of the ring, to send the correct current to the LEP ring shell to obtain the desired wavelength emitted. Alternatively, the microcontroller may be configured in response to a signal received from an external unit.

For example, in one embodiment, the electronic finger ring may be used as a means of communication in order to call for the attention of the ring carrier. In this embodiment, the ring may comprise a heat generating means configured to supply heat to the finger of the user in response to reception of a signal from an external unit by the RF antenna circuitry. To this end, the microcontroller may be configured to, in response to a signal received by the RF antenna circuitry, control the heat generating means to transfer heat to the inner circumference of the ring (i.e. the surface facing the finger of the user) so that the user is notified that the signal is received by the increased temperature of the ring.

In one embodiment, the ring comprises a micromechanical component as part of the electronic circuit in the form of a vibration motor by means configured to supply mechanical vibrations to the finger of the user in response to reception of a signal from an external unit. To this end, the microcontroller may be configured to, in response to a signal received by an antenna of the ring, control the magnitude or time interval (frequency) generated so that the user is notified that the signal is received by the vibrations of the ring.

In one embodiment, the aforementioned pressure sensor is located in a cavity within the electronic finger having the inlet hole facing the inner circumference opening optimized, as above described geometry, to function as a finger plethysmograph providing a non-invasive measurement for changes in finger blood flow reflected by pulse wave amplitude (PWA). The end application used could either be, for example, for medical, health or dating purposes.

In one embodiment, the aforementioned pressure sensor, when located in the cavity within the electronic finger having the inlet hole facing the inner circumference opening, could be replaced by a temperature sensor sensing the temperature of the fingering user. The end application used could either be, for example, for medical, health or dating purposes.

The electronic finger ring has herein been described mainly in the context of an electronic finger ring functioning as a 4-dimensional steering device for controlling an external electronic device, such as a computer. However, it should be appreciated that many of the teachings disclosed herein are advantageous also when the electronic finger ring is adapted for other applications, such as identification, electronic payment, etc., mentioned in the summary of the invention, or for "heat- or vibration or light emitting communication" as described in the above passage.

It should also be understood that the set of electronic and/or electromechanical components integrated in the ring may be easily adapted to the intended use of the ring. For example, the electronic finger ring needs not to include an accelerometer or a pressure sensor when used for identification of the user wearing it. In this case, it may be sufficient to integrate the microcontroller (programmed with an identification number or the like) and the antenna circuitry in the electronic finger ring.

Computerized methods and systems of a wearable ring device can include provided various ways for a user to interact with another computing device (e.g. a mobile device such as an ATM, PoA, a smart phone, tablet computer, other wearable computing system, a smart telephone, augmented-reality head-mounted display, smart television system, wearable-body sensors, home automation systems, smart refrigerator systems, automobile computing systems, computing systems integrated into consumer goods, etc.). In one example, it can be detected that a user is touching on the palm using the wearable ring device worn on user's thumb. The wearable ring device can include a skin detector sensor that can identify a user touch event. The skin detection sensor can communicate signal values indicating the touch event to a processor in the wearable ring device. The processor can then identify the touch event with various signal recognition techniques. The processor can then communicate acknowledgment of the detected touch event to an active optical sensor and/or IMU. The optical sensor can obtain an image of the attributes of a region of the user's hand/fingers that are in the view of the optical sensor. For example, the optical sensor can obtain an image of the phalanges and/or the lines of a finger near the user's thumb, it is noted that the digital image can be saved to a database in the apparatus itself.

The captured digital images can be processed in the wearable ring device. For example, a DSP can identify the number of lines in the image and calculate the distance between the lines. This can be used as a user authentication technique for access to an end computing device. Additionally, the DSP can identify the length and difference between each line. These values can also be saved in the database of the wearable ring device itself.

In one example, various training and/or initialization processes can be performed so that the wearable ring device can register/save a the attributes of a region of the user's hand/fingers that are in the viewable by the optical sensor (e.g. the user's phalange and line shapes, median ridges distances for a user in a user of skin of a user's finger, etc.). Accordingly, after the configuration/set up is completed, one or more wearable ring devices can be worn by the user. For example, a wearable ring device can be worn on the user's thumb. A detected touch event on the wearable ring device can cause the touch sensor (e.g. a device such as a force-sensitive switch, a capacitance sensor, capacitive proximity sensors, etc. that uses contact to generate feedback in computing system) to communicate the values to processor to active optical sensor and IMU and/or optical finger navigation (OFN). Digital images of the user's phalange and/or line shapes can then be obtained using Optical sensor. These digital images can be sent to the DSP. DSP can process the image and identify the unique properties of the skin of the user's phalanges and/or figure lines (or other user hand/finger skin attributes in other examples). These properties can be compared with the database data in the apparatus. If a match is determined, then the values and/or other command can then be sent end device via a wireless communication protocol (e.g. Bluetooth® and/or other communication medium). For example, when detecting a gesture, an IMU sensor can obtain and communicate the x,y,z coordinate values and an OFN sensor can measure and communicate x,y coordinate values and/or other command can be process to a microcontroller for this information can be sent to an end device via a wireless communication protocol (e.g. Bluetooth® and/or other communication medium).

Digital images of various user finger/hand regions can be associated with various command inputs. Specified tolerance thresholds can be assigned. For example, when digital image include at least eighty percent of a skin portion of a phalange region of the user's right index finger then communicate a command to take a picture with the user's Google Glass® device to said device. Additionally, in some examples, the wearable ring device can include various systems for detecting user gesture patterns. User gesture patterns, digital images of various user finger/hand regions and/or a combination thereof can be used as input for an end device.

Figure 3:
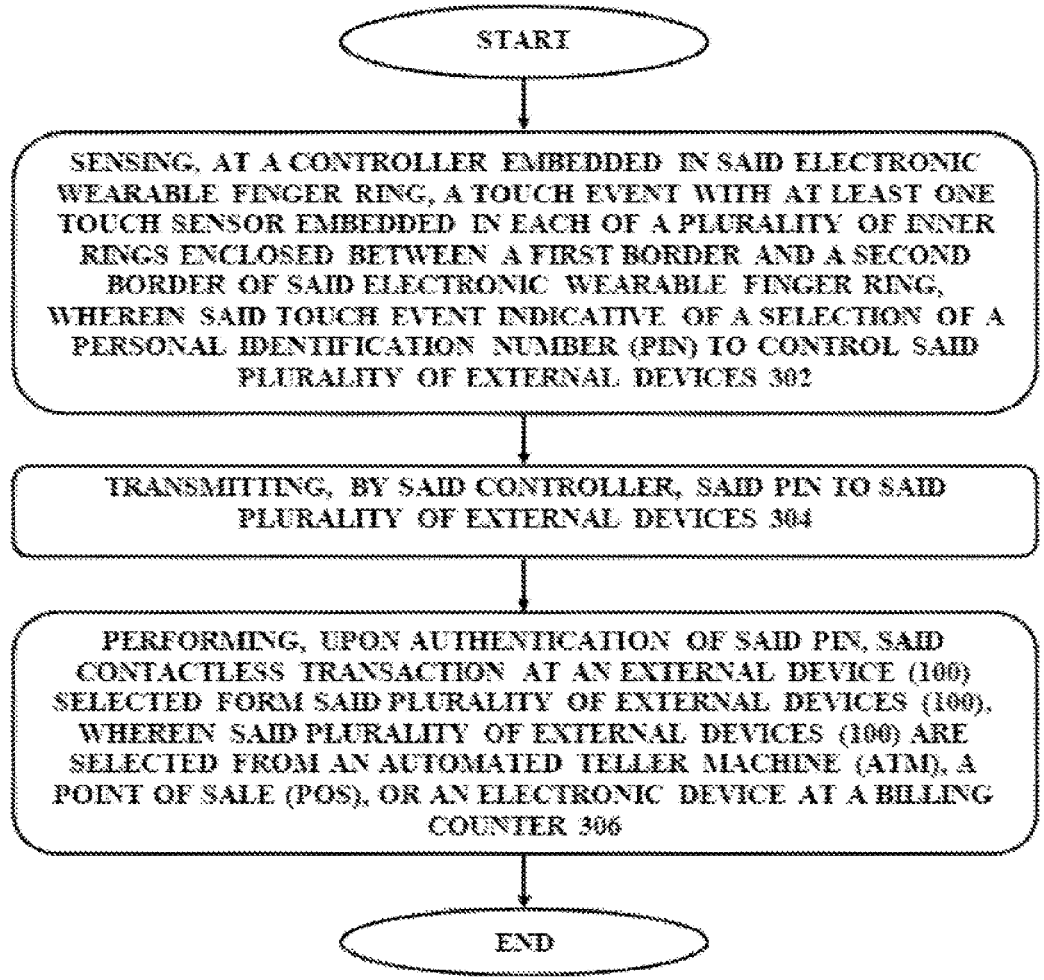
FIG. 3 illustrates a flowchart to elaborate working of the proposed contactless transaction system, in accordance with an exemplary embodiment of the present disclosure.

FIG. 3 illustrates a flowchart to elaborate working of the proposed contactless transaction system, in accordance with an exemplary embodiment of the present disclosure. The method may be described in the general context of computer executable instructions. Generally, computer executable instructions can include routines, programs, objects, components, data structures, procedures, modules, functions, etc., that perform particular functions or implement particular abstract data types. The method may also be practiced in a distributed computing environment where functions are performed by remote processing devices that are linked through a communications network. In a distributed computing environment, computer executable instructions may be located in both local and remote computer storage media, including memory storage devices.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above proposed system.

At block 302, a controller (208) embedded in said electronic wearable finger ring senses a touch event with at least one touch sensor embedded in each of a plurality of inner rings (204-1, 204-2, 204-n) enclosed between a first border and a second border of said electronic wearable finger ring, wherein said touch event indicative of a selection of a personal identification number (PIN) to control said plurality of external devices (100).

At block 304, the controller transmits said PIN to said plurality of external devices (100).

At block 306, upon authentication of said PIN, said contactless transaction is performed at an external device (100) selected form said plurality of external devices (100), wherein said plurality of external devices (100) are selected from an automated teller machine (ATM), a point of sale (POS), or an electronic device at a billing counter.

In an exemplary embodiment, each of said plurality of inner rings (204-1, 204-2, 204-n) comprises a plurality of selectable numbers, and wherein selecting a pre-configured sequence of said selectable numbers, indicative of the PIN, from the plurality of selectable numbers provided on each of said plurality of inner rings (204-1, 204-2, 204-n) triggers said controller (208) to control said plurality of external devices (100).

In another exemplary embodiment, each of said plurality of inner rings comprises a plurality of selectable colors, and wherein selecting a pre-configured sequence of said selectable colors, indicative of the PIN, from the plurality of selectable colors provided on each of said plurality of inner rings (204-1, 204-2, 204-n) triggers said controller (208) to control said plurality of external devices (100).

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

As used herein and in the appended claims, the singular forms "a", "and", and "the" include plural referents unless the context clearly dictates otherwise. Thus, for example, reference to "a process" includes a plurality of such processes and reference to "the electrode" includes reference to one or more electrodes and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, or groups.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

ADVANTAGES OF THE PRESENT INVENTION

The proposed smart ring of the present invention provides flexibility to the users to travel and/or do transaction without bank cards.

The proposed smart ring of the present invention ensures once RPIN is valid then only RFID stats functioning The proposed smart ring of the present invention provides two level security authentications one on the ring as R-PIN (Ring PIN) and second one is appropriate bank ATM PIN or any other authentication process like biometric.

The proposed smart ring of the present invention enables the user with a provision to enable or disable the RFID feature on the ring through smartphone.

The proposed smart ring of the present invention provides no limitations on bank account to associate with single ring.

The proposed smart ring of the present invention requires no battery.

The proposed smart ring of the present invention is water proof.

I claim:

1. An electronic wearable finger ring (200) to control a plurality of external devices (100) for performing a contactless transaction, said electronic wearable finger ring comprising:

a first border (202) and a second border (206), wherein said first border (202) and said second border (206) encloses a plurality of inner rings (204-1, 204-2, 204-n), each of the plurality of inner rings (204-1, 204-2, 204-n) having diameter equal to the diameter of said electronic wearable finger ring (200) and configured to control a plurality of external devices (100) for performing said contactless transaction.

2. The electronic wearable finger ring (200) as claimed in claim 1, wherein at least one of said plurality of inner rings (204-1, 204-2, 204-n) is rotatable.

3. The electronic wearable finger ring (200) as claimed in claim 1, wherein each of said plurality of inner rings (204-1, 204-2, 204-n) is to set the PIN (RPIN).

4. The electronic wearable finger ring (200) as claimed in claim 1, wherein each of said plurality of inner rings (204-1, 204-2, 204-n) is to set the priority number.

5. The electronic wearable finger ring (200) as claimed in claim 1, wherein said electronic wearable finger ring comprises:
   one or more processors;
   a controller (208), electronically coupled with each of said plurality of inner rings (204-1, 204-2, 204-n), to control the one or more processors to sense a touch event with at least one touch sensor embedded in each of the plurality of inner rings (204-1, 204-2, 204-n), wherein said touch event indicative of a selection of a personal identification number (PIN) to control said plurality of external devices (100).

6. The electronic wearable finger ring (200) as claimed in claim 5, wherein each of said plurality of inner rings (204-1, 204-2, 204-n) comprises a plurality of selectable numbers, and wherein selecting a pre-configured sequence of said selectable numbers, indicative of the PIN, from the plurality of selectable numbers provided on each of said plurality of inner rings (204-1, 204-2, 204-n) triggers said controller (208) to complete transaction with said plurality of external devices (100).

7. The electronic wearable finger ring (200) as claimed in claim 5, wherein each of said plurality of inner rings (204-1, 204-2, 204-n) comprises a plurality of selectable colors, and wherein selecting a pre-configured sequence of said selectable colors, indicative of the PIN, from the plurality of selectable colors provided on each of said plurality of inner rings (204-1, 204-2, 204-n) triggers said controller (208) to control said plurality of external devices (100).

8. The electronic wearable finger ring (200) as claimed in claim 5, wherein said controller (208) is a transmitter chip triggered from a remote location.

9. The electronic wearable finger ring (200) as claimed in claim 1, wherein said electronic wearable finger ring is configured to electronically and communicable couple with said plurality of external devices (100) for performing said contactless transaction.

10. A method to control a plurality of external devices (100) for performing a contactless transaction using an electronic wearable finger ring (200), said method comprising:
   sensing, at a controller (208) embedded in said electronic wearable finger ring, a touch event with at least one touch sensor embedded in each of a plurality of inner rings (204-1, 204-2, 204-n) enclosed between a first border and a second border of said electronic wearable finger ring, wherein said touch event indicative of a selection of a personal identification number (PIN) to control said plurality of external devices (100);
   transmitting, by said controller (208), said PIN to said plurality of external devices (100); and
   performing, upon authentication, said contactless transaction at an external device (100) selected form said plurality of external devices (100), wherein said plurality of external devices (100) are selected from an automated teller machine (ATM), a point of sale (POS), or an electronic device at a billing counter.

11. The method as claimed in claim 10, wherein each of said plurality of inner rings (204-1, 204-2, 204-n) comprises a plurality of selectable numbers, and wherein selecting a pre-configured sequence of said selectable numbers, indicative of the PIN from the plurality of selectable numbers provided on each of said plurality of inner rings (204-1, 204-2, 204-n) triggers said controller (208) to control said plurality of external devices (100).

\* \* \* \* \*